(12) United States Patent
Hancock et al.

(10) Patent No.: US 10,187,431 B2
(45) Date of Patent: Jan. 22, 2019

(54) NETWORK TO NETWORK INTERFACE BETWEEN SERVICE PROVIDERS FOR WEB REAL TIME COMMUNICATION

(71) Applicant: Cable Television Laboratories, Inc., Louisville, CO (US)

(72) Inventors: David Hancock, Louisville, CO (US); Ed Miller, Louisville, CO (US); Kurt Fennell, Louisville, CO (US); Sumanth Channabasappa, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 63 days.

(21) Appl. No.: 15/155,447

(22) Filed: May 16, 2016

(65) Prior Publication Data

US 2016/0337410 A1     Nov. 17, 2016

Related U.S. Application Data

(60) Provisional application No. 62/161,317, filed on May 14, 2015.

(51) Int. Cl.
*H04L 29/06* (2006.01)
*H04L 29/12* (2006.01)

(52) U.S. Cl.
CPC ........ *H04L 65/1069* (2013.01); *H04L 65/608* (2013.01); *H04L 61/1594* (2013.01); *H04L 61/303* (2013.01)

(58) Field of Classification Search
CPC .............. H04L 61/1594; H04L 61/303; H04L 65/1069; H04L 65/608
See application file for complete search history.

(56) References Cited

U.S. PATENT DOCUMENTS

| 2015/0029296 | A1* | 1/2015 | Ni ........................ H04N 7/148 348/14.01 |
| 2015/0373056 | A1* | 12/2015 | Bouthemy .......... H04L 65/1006 709/203 |
| 2017/0048367 | A1* | 2/2017 | Karkkainen ............ H04M 1/57 |

* cited by examiner

*Primary Examiner* — Kan Yuen
(74) *Attorney, Agent, or Firm* — Duft Bornsen & Fettig LLP

(57) ABSTRACT

Systems and methods presented herein provide for real time communications between service provider subscribers. In one embodiment, a web server is operable to provide a network-to-network interface (NNI) with a plurality of service providers, to communicate with the service providers through WebRTC links, and to retrieve contact information of subscribers to the service providers over the WebRTC links. The web server also includes a database operable to store the contact information of the subscribers. The web server is also operable to process a connection request from a first of the subscribers to connect with a second of the subscribers, to retrieve the second subscriber's contact information from the database, to push a notification message to a device of the second subscriber using the second subscriber's contact information (e.g., a user identity), and to establish a WebRTC connection between first and second subscribers when the second subscriber accepts the connection.

20 Claims, 8 Drawing Sheets

NETWORK TO NETWORK INTERFACE BETWEEN SERVICE PROVIDERS FOR WEB REAL TIME COMMUNICATION

CROSS REFERENCE TO RELATED APPLICATIONS

This patent application claims priority to, and thus the benefit of an earlier filing date from, U.S. Provisional Patent Application No. 62/161,317 (filed May 14, 2015), the entire contents of which are hereby incorporated by reference.

BACKGROUND

Modern telecom provides global reach allowing any user to call any other user in the global network. The systems providing this global communications are built on a "half-call" model where the role of providing services during a call is shared between the originating and terminating networks. This scales well in terms of identity in that each user has a single identity that belongs to a single service provider. However, applying the half-call model globally comes at a cost. For example, the half-call model typically employs complex routing and interworking procedures to enable different service providers to find each other and deliver voice/video services across their boundaries.

Web Real-Time Communication (WebRTC) is designed around a "full-call" model, where a single WebRTC application delivers its service to both the calling and the called users. Since there is a single service-delivery entity, there is no need to deploy an inter service provider routing infrastructure. However, for service providers desiring global reach, this model does not scale well in terms of identity because each WebRTC service provider would need to assign and manage identities for all users in the global network. Alternatively or additionally, each user would generally be required to handle many identities, one for each WebRTC service provider.

SUMMARY

Systems and methods presented herein provide for real time communications between service provider (e.g., Internet service providers, or "ISPs") subscribers. In one embodiment, a WebRTC system includes a web server operable to provide a network-to-network interface (NNI) with a plurality of service providers, to communicate with the service providers through WebRTC links, and to retrieve contact information of subscribers to the service providers over the WebRTC links. The system also includes a database operable to store the contact information of the subscribers. The web server is also operable to process a connection request from a first of the subscribers to connect with a second of the subscribers, to retrieve the second subscriber's contact information (e.g., a user identity) from the database, to push a notification message to a device of the second subscriber using the second subscriber's contact information, and to establish a WebRTC connection between first and second subscribers when the second subscriber accepts the connection.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
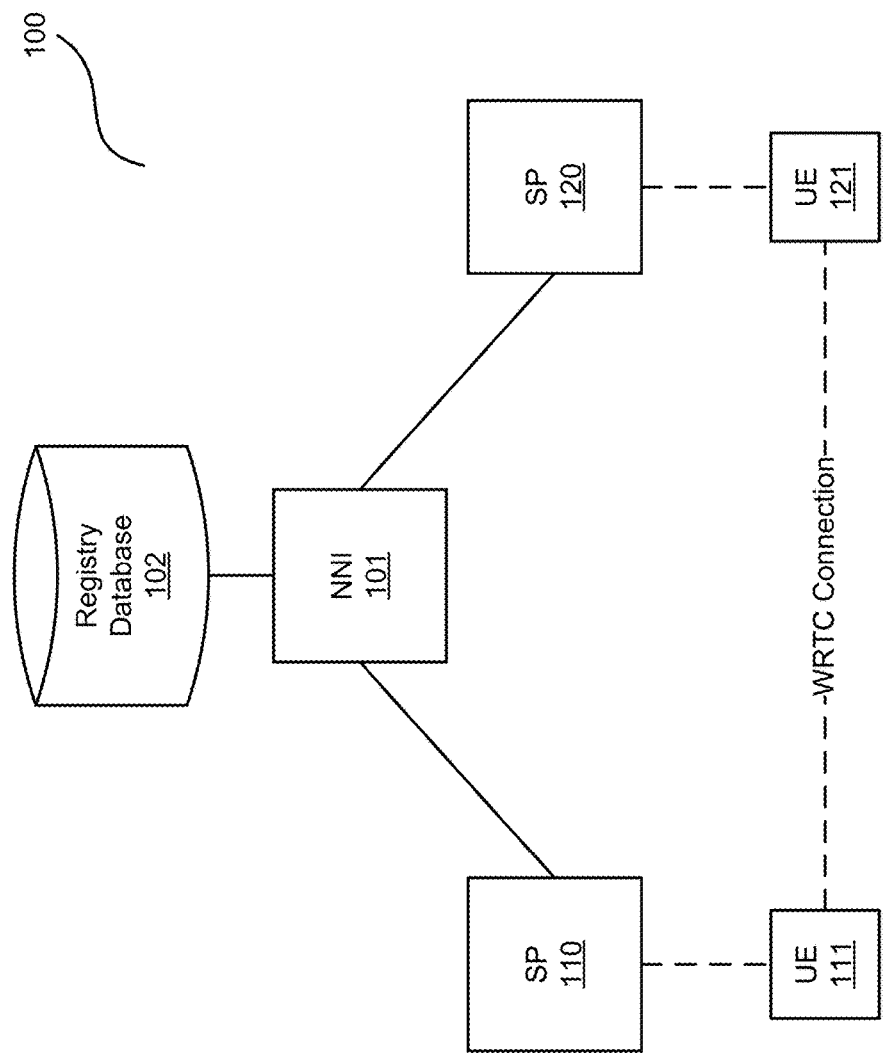
FIG. 1 is a block diagram of an exemplary of a WebRTC communication system.

FIG. 1 is a block diagram of an exemplary of a WebRTC communication system 100. In this embodiment, the WebRTC communication system 100 includes a registry database 102 that is operable to store and maintain contact information, including phone numbers, email addresses, physical addresses, usernames, and the like of subscribers (a.k.a. "users") to the service providers 110 and 120. An NNI 101 provides a network-to-network interface between the service providers 110 and 120 that allows a user of the UE 111 to contact its service provider 110, and to retrieve contact information of a user of the UE 121 from the registry database 102 such that the UE 111 can communicate with the UE 121 via WebRTC communications between the service providers 110 and 120 via voice, video (e.g., video conferencing), text, email, etc.

In some embodiments, user/subscriber contact information is identified by a "user identity". The user identity operates as a handle that uniquely identifies the person, but does not provide any information on the user's location (e.g., "attachment point"), name, telephone number, email address, etc. in the global network. As such, when an WebRTC session is established with another user, the session identifies that user with his/her user identity, for example, by selecting an entry from a contact list (see e.g., FIG. 7).

Since the user's identity does not contain information on where the user is located in the network, the NNI 101 may obtain routing information to the target user via the user identity as a key. The user identity generally contains enough information to identify a target user including a fully qualified domain name (FQDN) that can be resolved via a domain name service (DNS) to the ingress point in the network of a service provider that controls the target user identity. An example of such may be expressed as follows user@notify-gateway-1.comcast.com. Other examples are shown and described below.

The NNI 101 also allows the subscriber of the service provider 110 to contact another subscriber of the service provider 110. Although for the purposes of the exemplary embodiments shown and described herein, discussion of the aspects and features hereof are directed to two different service providers so as to provide the reader with the concept of global communications through different service providers.

The NNI 101 is any system, device, software, or combination thereof operable to establish WebRTC communications between the UEs 111 and 121 through their respective service providers 110 and 120. In one embodiment, the NNI 101 is a web server (e.g., an Internet server) remotely located from the service providers 110 and 120 that allows the service providers 110 and 120 to establish a WebRTC connection between the UEs 111 and 121 through, for example, their web browsers.

In one embodiment, once the UE 121 has accepted an invitation to join a WebRTC session, a WebRTC application is downloaded into the browser of the UE 111 and/or the UE 121. Thus, the two instances of the WebRTC application running in the two browsers can communicate with each other over a preconfigured signaling mechanism to establish the real-time communications between the two UEs 111 and 121. Alternatively or additionally, the WebRTC application may reside on one or more of the service providers 110/120 and the NNI 101. Examples of such applications are shown and described below in FIGS. 3-6.

Alternatively or additionally, a browser of the UE 111 may obtain the WebRTC application in the form of a JavaScript executable received in a 200OK response to an "HTTP Get" message. Thus, the browser would receive the WebRTC application when the subscriber first logs into the NNI 101.

The registry database 102 is any system, device, software, or combination thereof operable to store the contact information of the subscribers to the service providers 110 and 120. The registry database 102 may be implemented with the NNI 101 or as a separate system. Examples of the UEs 111 and 121 include smart phones, computers, tablet computers, cable television set-top boxes, smart televisions, and the like.

Figure 2:
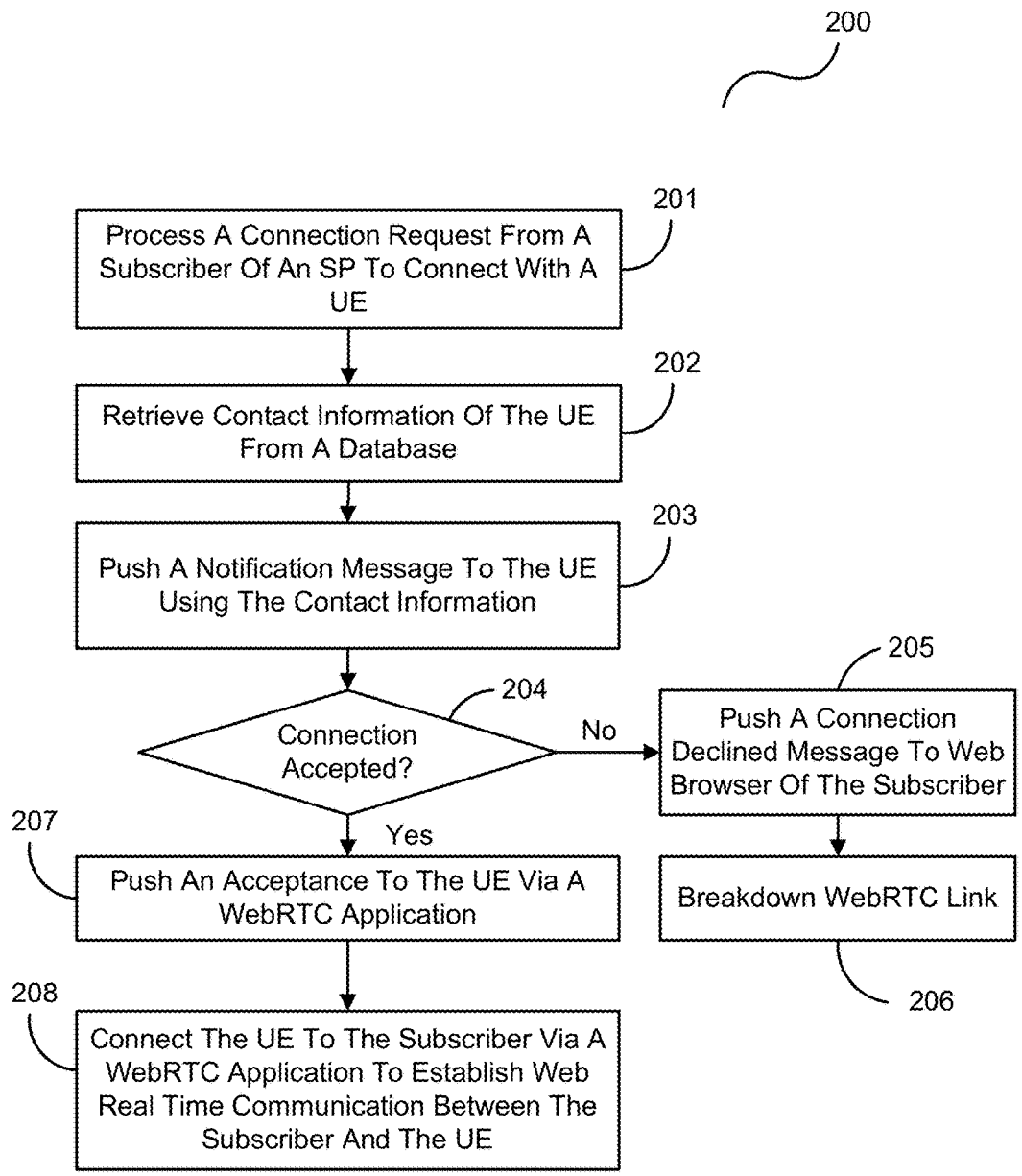
FIG. 2 is a flowchart illustrating an exemplary process operable with the WebRTC communication system of FIG. 1.

FIG. 2 is a flowchart illustrating an exemplary process 200 operable with the WebRTC communication system 100 of FIG. 1. In this exemplary embodiment, the two service providers 110 and 120 provide Internet communications to their respective subscribers via the UEs 111 and 121, respectively. Again, the illustration of the two service providers 110 and 120 and the UEs 111 and 121 are used to aid the reader in understanding the features and aspects hereof.

The process 200 initiates when a subscriber via the UE 111 transmits a connection request to the NNI 101 to connect with a subscriber using the UE 121. In this regard, the NNI 101 processes the connection request from the UE 111 through the service provider 110, in the process element 201. Upon processing the connection request, the NNI 101 retrieves contact information of the UE 121 from the registry database 102, in the process element 202. With this information in hand, the NNI 101 then pushes a notification message to the UE 121 using the subscriber's contact information, in the process element 203. For example, the NNI 101 may transfer the notification message to the service provider 120 over a WebRTC communication link (e.g., via the Internet). The service provider 120, in turn, routes the notification message to the UE 121 over another WebRTC communication link giving the user of the UE 121 the opportunity to communicate with the user of the UE 111. In this regard, the notification message may include a Universal Resource Locator (URL) that the user of the UE 121 can link to.

The NNI 101 then determines whether the user of the UE 121 has accepted the connection, in the process element 204. For example, when the user of the UE 121 accepts the connection, the UE 121 transfers a connection acceptance message to the service provider 120, which may then be forwarded to the NNI 101. If the connection has not been accepted by the user of the UE 121 (e.g., because the user does not wish to communicate and/or is simply unavailable to communicate), then the NNI 101 pushes a connection declined message to the UE 111, in the process element 205. For example, the NNI may transfer the connection declined message over a WebRTC link with the service provider 110, which in turn, transfers the connection declined message to the UE 111. This informs the user of the UE 111 that the connection will not take place. Thereafter, the NNI 101 breaks down the WebRTC link with the service provider 120, in the process element 206.

If the connection is accepted, then the NNI 101 pushes an acceptance to the UE 120 via a WebRTC application, in the process element 207. The NNI 101 may also operate a WebRTC application on the web browser of the UE 110. From there, the NNI 101 connects the UEs 111 and 121 across the Internet to establish real-time communications between the UEs 111 and 121, in the process element 208 (e.g., via one or more WebRTC applications). Once the communication is no longer necessary, the NNI 101 may break down the WebRTC communication link between the UEs 111 and 121 as well as any WebRTC applications running thereon.

It is also possible that the NNI 101 retrieves the routing information required by the service provider 110 and delivers that routing information such that the service provider 110 can contact the service provider 120 and establish WebRTC communications between the service providers 110 and 120, and thus the UEs 111 and 121. In this regard, the service provider 110 may implement a WebRTC application that communicates with the UEs 111 and 121 directly. Alternatively or additionally, the WebRTC application of the service provider 110 may simply contact a push notification service of the service provider 120 to contact the UE 121. Examples of such are shown and described in the following use cases of FIGS. 3-6.

The NNI 101 may also implement security measures that prevent users from being "spammed". For example, assume that the user of the UE 111 is an unwanted call initiator. The NNI 101 may receive a connection request message from UE 111 through the service provider 110 attempting to initiate a call with the UE 121. The NNI 101 may contact the registry database 102 to determine that the UE 121 possesses no contact information relating to the user of the UE 111. Accordingly, when the user of the UE 111 attempts to contact the UE 121, the NNI 101 may deny the connection request. Alternatively or additionally, the NNI 101 may contact the UE 121 to ascertain whether the user of the UE 121 knows of the user of the UE 111, thereby giving the user of the UE 121 the ability to deny the connection request based on credentials of the UE 111.

Although shown and described with respect to two service providers 110 and 120 and two UEs 111 and 121, the invention is not intended to be limited as such. Rather, the NNI 101 may be operable to interface with a plurality of different service providers. And, each of the service providers may provide communication services to a plurality of UEs (e.g., thousands and possibly even millions). Examples of the service providers 110 and 120 include Internet service providers, such as Comcast (United States), Charter Communications (United States), Bright House Networks (United States), Jupiter Telecommunications Company (Japan), Kabel Deutschland Vertrieb and Services GmbH (Germany), etc.

As each of these service providers may employ different operations, the NNI 101 is operable to adapt (e.g., translate) to each of the service providers 110 and 120 so as to provide a WebRTC connection between the UEs 111 and 121. For example, in a half-call model, deploying a new WebRTC service across the global network generally requires each service provider to update their NNI to support the standard interworking procedures for that service and/or add translation rules that enable the standard NNI to interwork with their own internal structures. Either way, the half-call model does not scale well. The advantages of the embodiments described herein allow all service providers to support a thin/simple NNI notification protocol (e.g., as described below in FIGS. 3-6) such that new WebRTC services can be deployed globally with no further impact to the NNI. The roll out of new services in a federated network scales at the same high level that can be achieved by non-federated Over The Top (OTT) providers.

Figure 3:
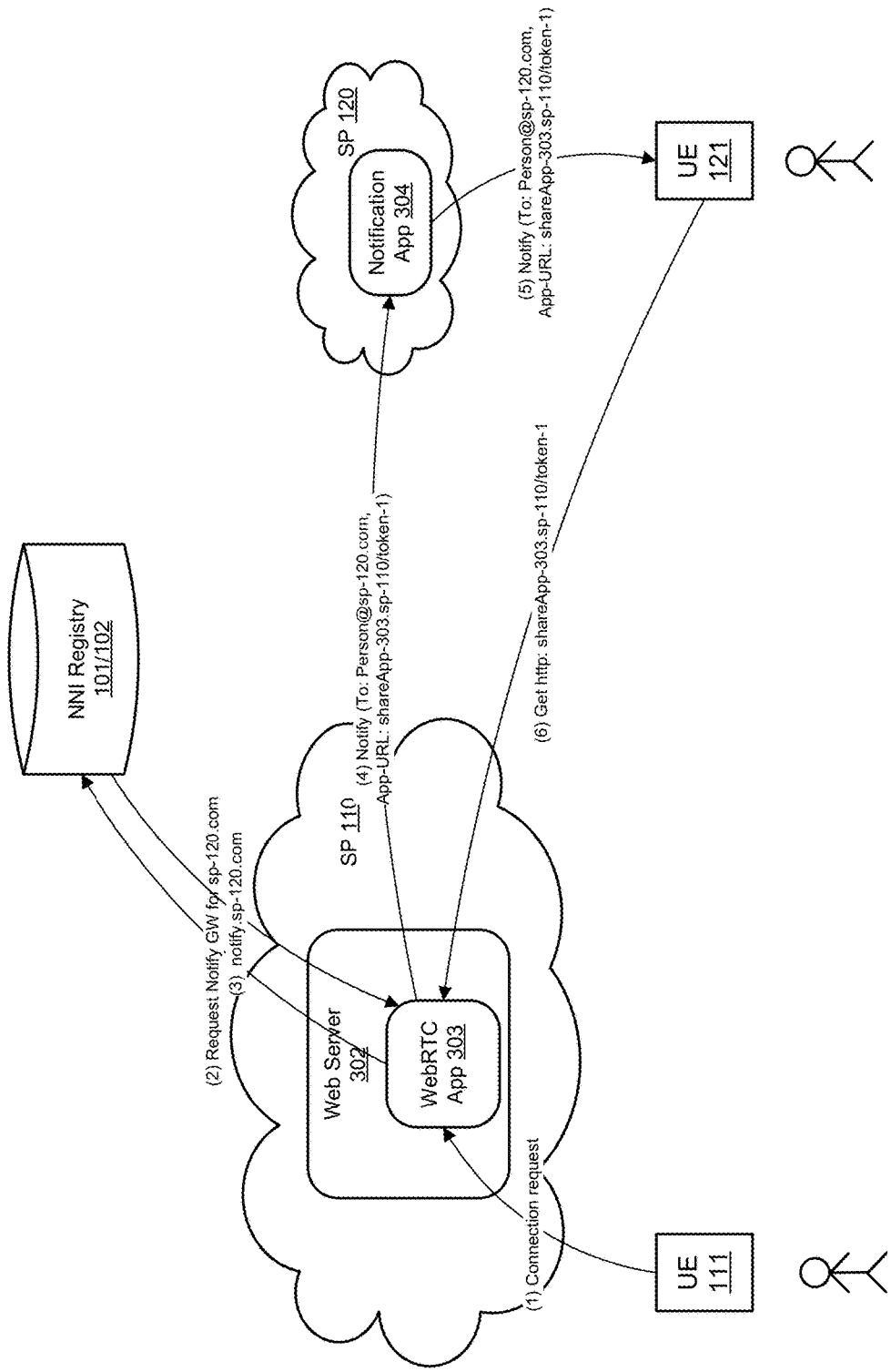
FIGS. 3-6 illustrate exemplary use cases of the WebRTC communication system.

FIG. 3 is a block diagram of a use case in which the service provider 110 comprises a web server 302 that is operable to implement a WebRTC application 303. The UE 111 sends a connection request to the WebRTC application 303 to establish WebRTC communications with the UE 121. In this embodiment, the user of the UE 111 already possesses the contact information of the user of the UE 121. The WebRTC application 303 then contacts the NNI registry 101/102 (a combined NNI 101 and registry database 102) to request a notification gateway for the service provider 120. The NNI registry 101/102 transfers a notification message (notify.sp-120.com) to the WebRTC application 303 to alert the WebRTC application 303 of the contact information of the service provider 120. Such may be implemented as a fully qualified domain name (FQDN) that essentially resolves the DNS to a notification application 304 of the service provider 120.

The WebRTC application 303 then notifies the service provider 120 that the UE 111 wishes to communicate with the subscriber of the service provider 120. This is implemented as a notification message from the WebRTC application 303 that includes the contact information of the subscriber as follows: Notify (To: Person@sp-120.com, App-URL: shareApp-303.sp-110/token-1). This notification message includes the URL that points to the WebRTC application 303 and presents the notification application 304 with a token of the WebRTC application 303. The notification application 304 of the service provider 120 then contacts the UE 121 with the same information provided to the notification application 304. The UE 121 then contacts the WebRTC application 303 (Get http: shareApp-303.sp-110/token-1) such that it may share the application 303 with the UE 111 and establish WebRTC communications between the UEs 111 and 121 (i.e., assuming that the user of the UE 121 accepts the connection request to communicate).

Figure 4:
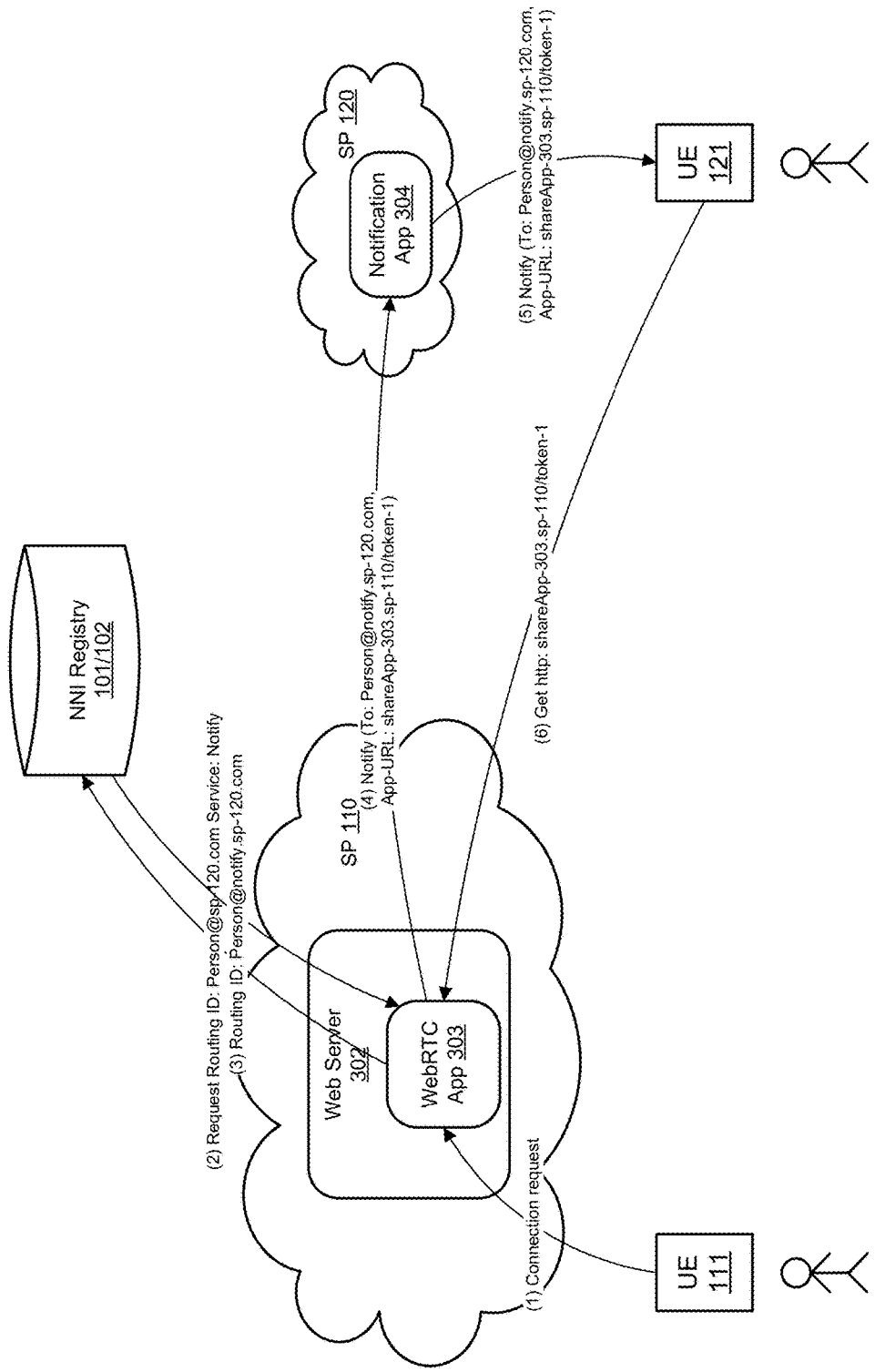

FIG. 4 is a block diagram of a use case similar to that of FIG. 3. However, in this embodiment, the user of the UE 111 does not possess the contact information of the user of the UE 121. Accordingly, the WebRTC application 303 requests the routing ID of the user of the UE 121 (Request Routing ID: Person@sp-120.com Service: Notify). Once received, the WebRTC application 303 contacts the notification application 304 of the service provider 120 (Notify (To: Person@notify.sp-120.com, App-URL: shareApp-303.sp-110/token-1)) such that the use case can continue as that illustrated in FIG. 3. This advantageously provides distribution of routing information among service providers to scale as the number peering service providers increases.

Figure 5:
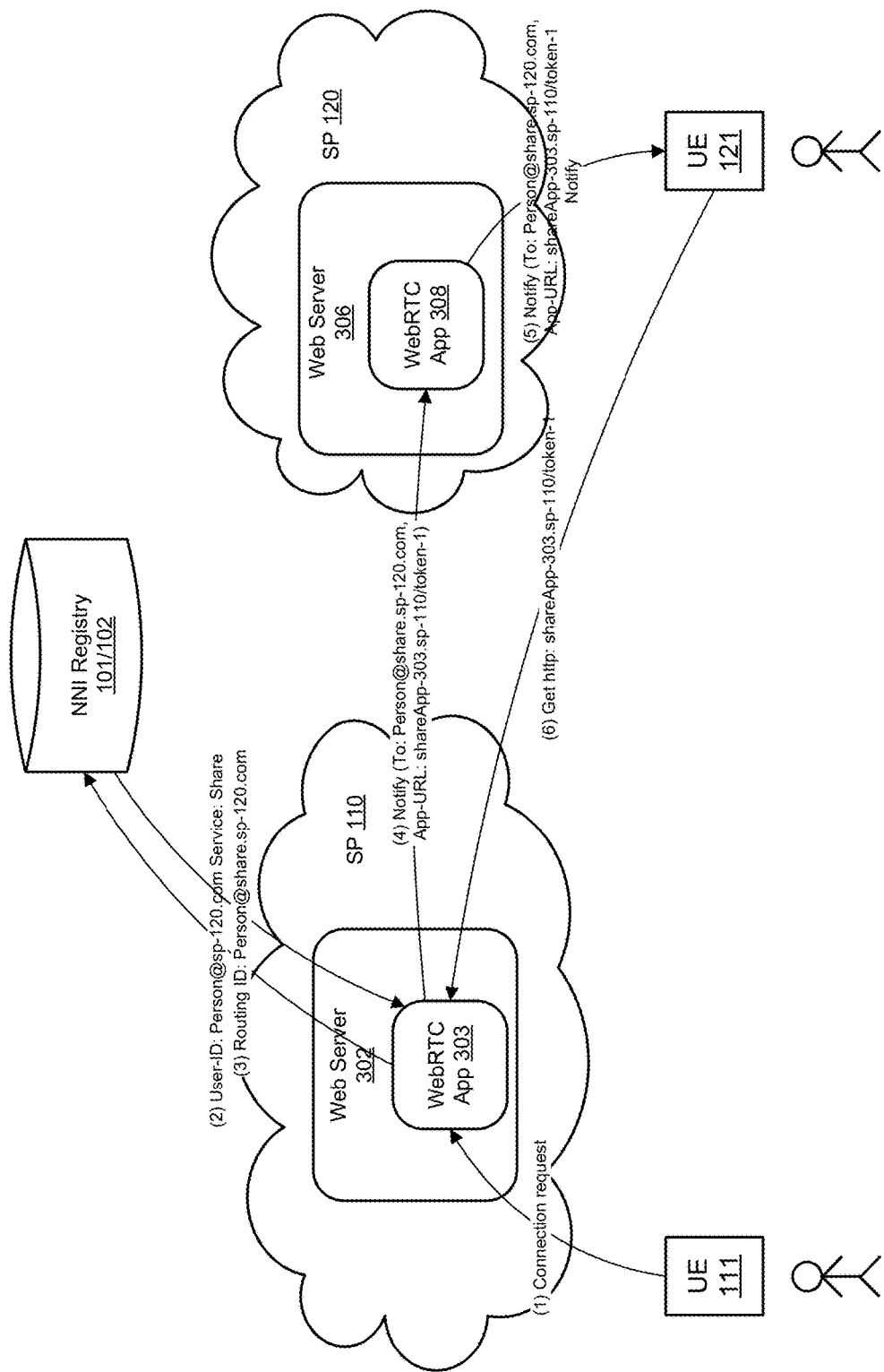

FIG. 5 is a block diagram of a use case similar to those of FIGS. 3 and 4. However, in this embodiment, the service provider 110 requests the registry for the user of the UE 121 (i.e., the routing ID) for share service of the WebRTC application 303 as opposed to a notification service. In this regard, the service provider 120 also comprises a web server 306 implementing a WebRTC application 308. Thus, after the user of the UE 111 initiates a connection request, the WebRTC application 303 transfers a message to the NNI registry 101/102 as User-ID: Person@sp-120.com Service: Share. The NNI registry 101/102 responds with Routing ID: Person@share.sp-120.com that allows the WebRTC application 303 to contact the WebRTC application 308 of the web server 306 with a notification message (Notify (To: Person@share.sp-120.com, App-URL: shareApp-303.sp-110/token-1) to contact the UE 121. Afterwards, the UE 121 (assuming that the connection request is accepted) shares the WebRTC application 303 with the UE 111 to establish WebRTC communications between the UE 111 and 121, depending on the capabilities of the WebRTC application 303 and 308 (e.g., voice, text, white listing, blacklisting, etc.).

This embodiment may be implemented when a previous query of the registry for the notification service does not yield a routing ID because, for example, the user of the UE 111 subscribes to a share service and, as such, desires all share requests to invoke the user's share service for whatever value it might add (e.g., share service preferences such as white/black list filtering, find/follow-me, negotiated service control on the user's behalf, etc.). In this case, the WebRTC application 308 is a share service application that decides to allow the service provider 110 to host a share session thereby delivering a share URL. This allows the UE 121 to subsequently navigate to the provided URL (e.g., Get http: shareApp-303.sp-110/token-1).

Figure 6:
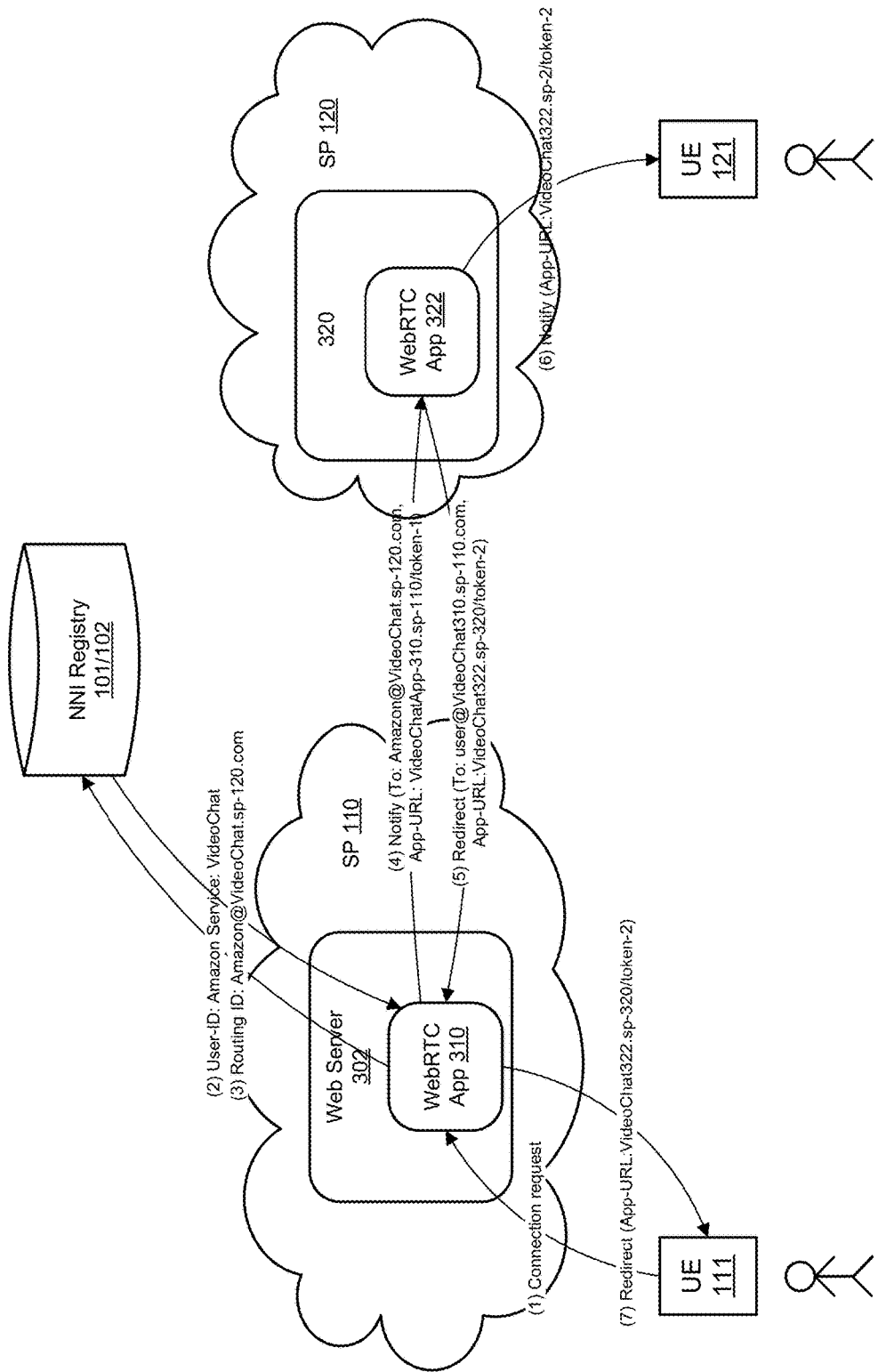

FIG. 6 is a block diagram of a use case with both initiating and terminating service providers being WebRTC providers in which the service provider 120 hosts the service. In this embodiment, the hosting service provider 120 implements a video chat. To illustrate, the hosting service provider 120 may be a company such as Amazon and the user of the UE 111 wishes to video chat with a representative of Amazon.

The session initiates when the UE 111 transfers a connection request to the WebRTC application 310. The WebRTC application 310 contacts the NNI registry 101/102 with the user ID of the Amazon video chat service (User-ID: Amazon Service: VideoChat). The NNI registry 101/102 responds with the routing ID of that service (Routing ID: Amazon@VideoChat.sp-120.com). The WebRTC application 310 then contacts Amazon's WebRTC application 322 with the notification message (Notify (To: Amazon@VideoChat.sp-120.com, App-URL: VideoChat-App-310.sp-110/token-1). The WebRTC application 322 redirects to the user of the UE 111 such that the WebRTC application 322 can manage the video chat (Redirect (To: user@VideoChat310.sp-110.com, App-URL: VideoChat322.sp-320/token-2)) and notifies the Amazon representative's UE 121 of the video chat (Notify (App-URL:VideoChat322.sp-2/token-2). The user of the UE 111 is then redirected to the video chat via a URL (Redirect (App-URL:VideoChat322.sp-320/token-2)) such that WebRTC communications can provide the video chat via the WebRTC application 322. Alternatively or additionally, the user of the UE 121 may obtain access to the WebRTC application 310 via a get message as illustrated in FIG. 5 (e.g., Get http: shareApp-310.sp-110/token-1).

It should be noted that the embodiments shown and described herein may provide other use cases as well. For example, the use case in FIG. 6 may be operable to provide video chat services that enable videoconferencing between professionals as opposed to businesses such as Amazon. It should also be noted that in the case of peering where the terminating network is a service provider simply employing notification only, no negotiation is required. Rather, the initiating service provider (e.g., service provider 110) may always host the WebRTC service. A terminating service provider (e.g., the service provider 120) can also provide "termination services" before the session is established, even if it negotiates itself out of supporting the session. Generally, the negotiation decides who will provide the service during the session.

Also, the negotiating mechanism is generally a matter of comparing the capabilities of the two applications of the service providers 110 and 120 (e.g., to the WebRTC Applications 310 and 322). For example, if the WebRTC application 310 supports one capability and the WebRTC application 322 supports multiple capabilities, then the WebRTC application 322 may be selected to host the WebRTC communications.

Figure 7:
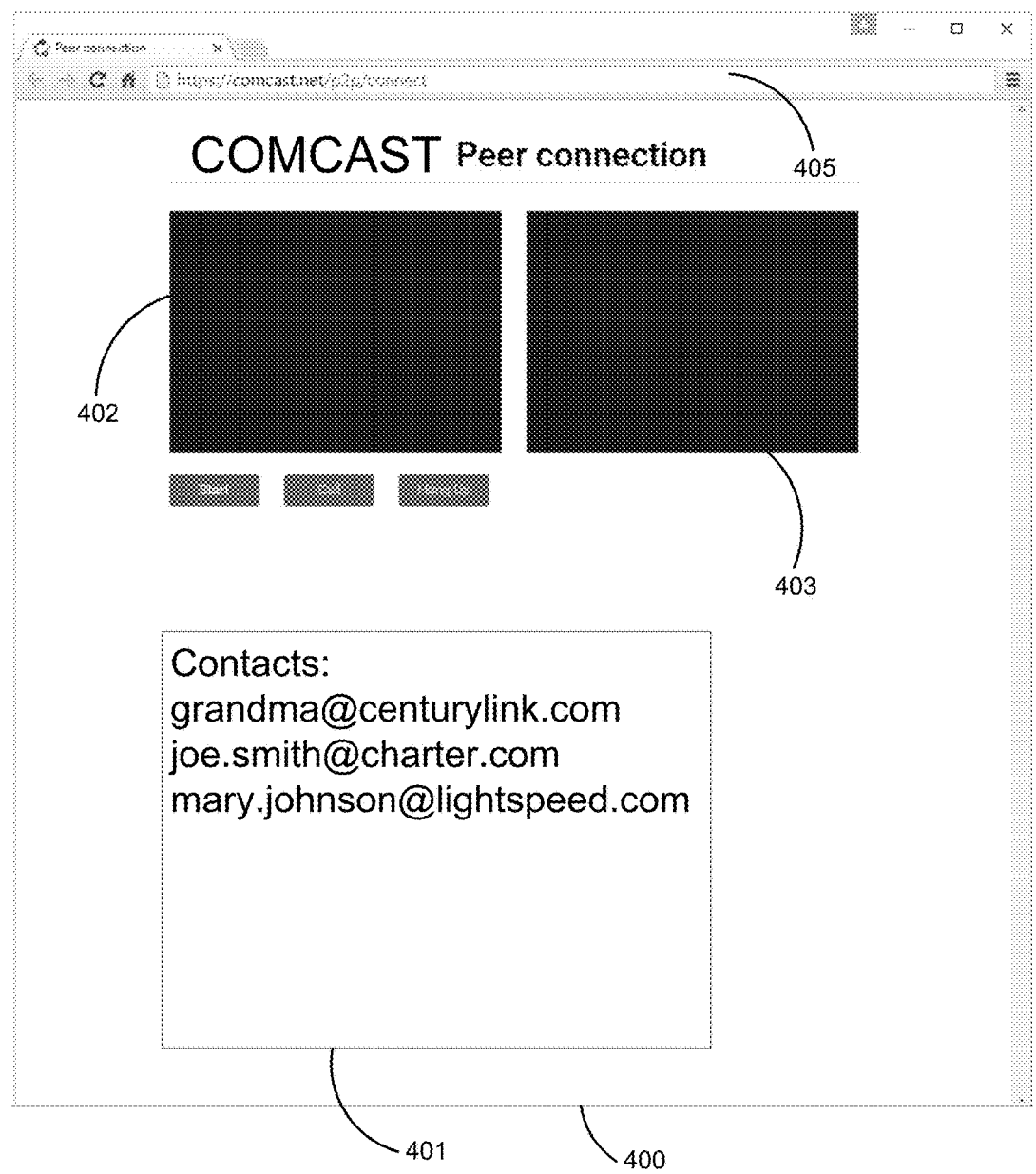
FIG. 7 is an exemplary web browser employing WebRTC communications.

FIG. 7 illustrates an exemplary web browser 400 that may be used to perform the WebRTC communications on a UE. For example, when a user of the UE 111 logs into its service provider, the user may then navigate to WebRTC communications (URL 405) on the web browser 400, such that the user of the UE 111 can establish WebRTC communications with another user.

In this embodiment, the user may be presented with the user's contacts (401) such that the user can select one of those contacts and initiate a call with another user. For example, the user may select joe.smith@charter.com that initiates a call with the user Joe Smith at another service provider. In this regard, the user may start the call and a video chat window 402 shows live video of the user while the video chat window 403 shows live video of Joe Smith.

Figure 8:
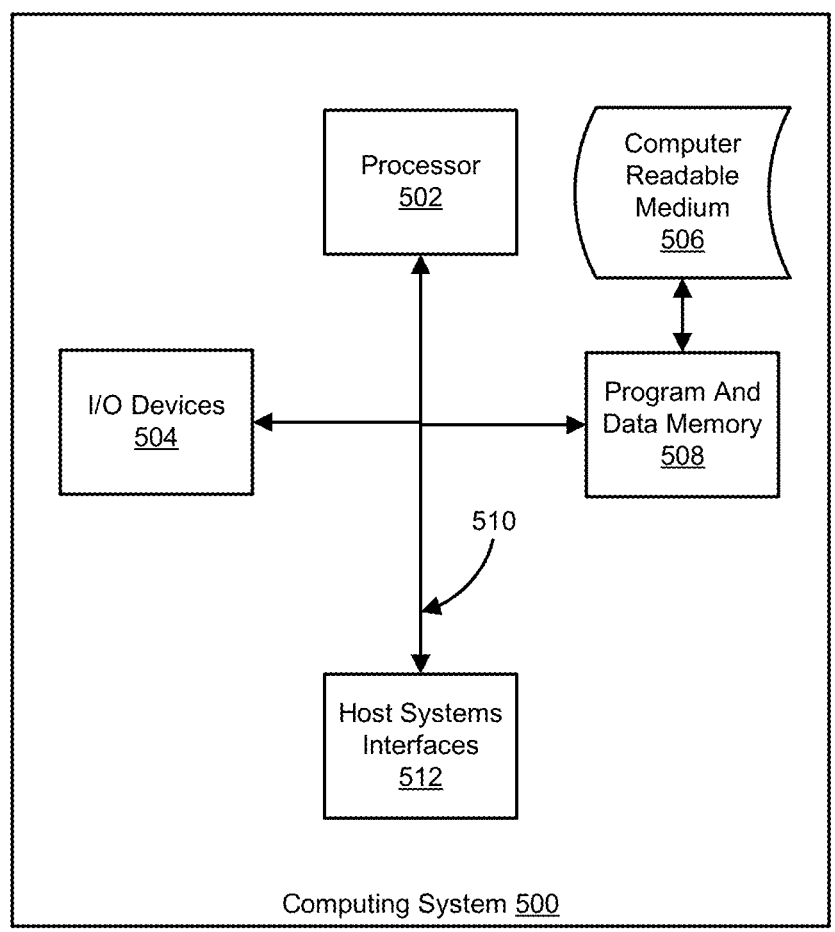
FIG. 8 is a block diagram of an exemplary computing system in which a computer readable medium provides instructions for performing methods herein.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 8 illustrates a computing system 500 in which a computer readable medium 506 may provide instructions for performing any of the methods disclosed herein.

Furthermore, the invention can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

What is claimed is:

1. A Web Real Time Communication (WebRTC) system, comprising:
    a web server operable to provide a network-to-network interface (NNI) with a plurality of service providers, to communicate with the service providers through WebRTC links, and to retrieve contact information of subscribers to the service providers over the WebRTC links; and
    a database operable to store the contact information of the subscribers,
    wherein the web server is further operable to process a connection request from a first of the subscribers to connect with a second of the subscribers, to retrieve the second subscriber's contact information from the database, to push a notification message to a device of the second subscriber via a WebRTC application using the second subscriber's contact information, and to establish a WebRTC link between the first and second subscribers when the second subscriber accepts the connection,
    wherein the web server is further operable to maintain a contact list for the first subscriber, to deliver the contact list to a device of the first subscriber through a web browser, and to deliver a WebRTC application to the first subscriber's web browser when the first subscriber logs in to a first of the service providers, and
    wherein the WebRTC application is operable to present the contact list to the first subscriber's web browser.

2. The system of claim 1, wherein
    the web server is further operable to configure a Uniform Resource Locator (URL) in the notification message that allows the second subscriber to establish the WebRTC link with the first subscriber.

3. The system of claim 1, wherein
the first subscriber subscribes to a first of the service providers and the second subscriber subscribes to a second of the service providers; and
the first and second service providers are different.

4. The system of claim 1, wherein
the web server is further operable to receive another connection request from the subscriber to connect with another person, to determine that the subscriber has no contact relationship with the other person, and to deny the connection request of the subscriber.

5. The system of claim 1, wherein
the contact list includes an identity of the second subscriber without providing information about the second subscriber's attachment point.

6. The system of claim 1, wherein
the web server is further operable to break down WebRTC link when the second subscriber declines the connection or when the WebRTC link is no longer needed.

7. The system of claim 1, wherein
the web server is further operable to establish a WebRTC link between at least two of the service providers.

8. The system of claim 1, wherein
the web server is further operable to retrieve a routing identification of the second subscriber that directs a WebRTC application of the first subscriber to directly contact a WebRTC application of the second subscriber.

9. The system of claim 1, wherein
the web server is further operable to configure a fully qualified domain name (FQDN) in the notification message.

10. The system of claim 1, wherein
the second subscriber's device is one or more of a smart phone, a computer, a set top box (STB), and a television.

11. A Web Real Time Communication (WebRTC) method operable in a web server, comprising:
providing a network-to-network interface (NNI) with a plurality of service providers;
communicating with the service providers through WebRTC links via the NNI;
retrieving contact information of subscribers to the service providers over the WebRTC links;
storing the contact information of the subscribers in a database;
processing a connection request from a first of the subscribers to connect with a second of the subscribers;
retrieving the second subscriber's contact information from the database;
pushing a notification message to a device of the second subscriber via a WebRTC application using the second subscriber's contact information;
establishing a WebRTC link between the first and second subscribers when the second subscriber accepts the connection;
maintaining a contact list for the first subscriber;
delivering the contact list to a device of the first subscriber through a web browser;
delivering a WebRTC application to the first subscriber's web browser when the first subscriber logs in to a first of the service providers; and
presenting the contact list to the first subscriber's web browser via the WebRTC application.

12. The method of claim 11, further comprising:
configuring a Uniform Resource Locator (URL) in the notification message that allows the second subscriber to establish the WebRTC link with the first subscriber.

13. The method of claim 11, wherein
the first subscriber subscribes to a first of the service providers and the second subscriber subscribes to a second of the service providers; and
the first and second service providers are different.

14. The method of claim 11, further comprising:
receiving another connection request from the subscriber to connect with another person;
determining that the subscriber has no contact relationship with the other person; and
denying the connection request of the subscriber.

15. The method of claim 11, wherein
the contact list includes an identity of the second subscriber without providing information about the second subscriber's attachment point.

16. The method of claim 11, further comprising:
breaking down WebRTC link when the second subscriber declines the connection or when the connection is no longer needed.

17. The method of claim 11, further comprising:
establishing a WebRTC link between at least two of the service providers.

18. The method of claim 11, further comprising:
retrieving a routing identification of the second subscriber that directs a WebRTC application of the first subscriber to directly contact a WebRTC application of the second subscriber.

19. The method of claim 11, further comprising:
configuring a fully qualified domain name (FQDN) in the notification message.

20. The method of claim 11, wherein
the second subscriber's device is one or more of a smart phone, a computer, a set top box (STB), and a television.

* * * * *